(12) United States Patent
Cruz et al.

(10) Patent No.: US 8,522,718 B2
(45) Date of Patent: Sep. 3, 2013

(54) TOP-FILL HUMMINGBIRD FEEDER WITH A CORK-TYPE TOP SEALING MEMBER

(75) Inventors: Robert T. Cruz, Lititz, PA (US); Marko Konstantin Lubic, Shillington, PA (US)

(73) Assignee: Woodstream Corporation, Lititz, PA (US)

( * ) Notice: Subject to any disclaimer, the term of this patent is extended or adjusted under 35 U.S.C. 154(b) by 358 days.

(21) Appl. No.: 12/929,931

(22) Filed: Feb. 25, 2011

(65) Prior Publication Data
US 2012/0216750 A1 Aug. 30, 2012

(51) Int. Cl.
*A01K 39/02* (2006.01)
(52) U.S. Cl.
USPC ................................ 119/72; 119/77
(58) Field of Classification Search
USPC .............. 119/72, 72.5, 73, 74, 77, 81
See application file for complete search history.

(56) References Cited

U.S. PATENT DOCUMENTS

| 7,600,487 B2 | 10/2009 | Stone et al. |
| 8,051,803 B2 | 11/2011 | Gauker et al. |
| 2010/0224132 A1 | 9/2010 | Gauker et al. |

*Primary Examiner* — Monica Williams
(74) *Attorney, Agent, or Firm* — Jacobson Holman PLLC (57) ABSTRACT

A top-fill hummingbird feeder has a generally upstanding liquid container with a large opening at its top end that is closed and sealed by a removable top or cap. The cap has a two-part construction including an outer shell and an inner sealing member. The inner sealing member includes a sealing element in the form of a vertically elongated, reinforced sealing ring that is received within the top of the container with a friction fit to automatically form a cork-type seal when the outer shell is threaded onto the container. Unthreading of the outer shell pulls the sealing ring out of engagement with the container to remove the cap.

20 Claims, 5 Drawing Sheets

FIG. 2

SECTION A-A

FIG. 3

SECTION C-C

TOP-FILL HUMMINGBIRD FEEDER WITH A CORK-TYPE TOP SEALING MEMBER

BACKGROUND OF THE INVENTION

1. Field of the Invention

The present invention is related to the field of bird feeders and, more particularly, to an airtight-sealing cap or cover for a top-fill hummingbird feeder.

2. Description of the Related Art

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the seeds or other dry food consumed by most birds from bird feeders. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining too rapidly out of the feeding basin. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated, now marketed by the assignee of the instant invention. The Opus feeder, described in U.S. Pat. No. 7,600,487 ("the '487 patent") includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the aforesaid cylindrical collar inside the feeding basin.

Another top-fill style hummingbird feeder is set forth in copending application, Ser. No. 12/213,924 ("the '924 application"), also owned by the assignee of the instant invention. This hummingbird feeder includes a generally upstanding reservoir bottle having a large opening at its top end that is sealed by a removable top or cap. The bottom of the bottle or container has a lower bottom opening which can be screw-threaded into a central collar of a feeding basin that has a plurality of feeding ports in a known arrangement. As a representative top-fill hummingbird feeder with which the cap of the present invention may be used, the '924 application is hereby incorporated by reference in its entirety as if fully set forth herein.

One problem associated with top fill hummingbird feeders such as those described above is the removable top or cap which must reliably form an airtight seal over the top opening of the reservoir bottle so that the necessary vacuum is formed and maintained above the liquid nectar retained in the bottle. If the removable cap is not properly designed to form the requisite airtight seal or cannot be reliably manipulated by the user to form such airtight seal, the top fill hummingbird feeder will not operate properly.

SUMMARY OF THE INVENTION

It is an object of the present invention to provide a reliable, consumer-friendly cap for a top-fill hummingbird feeder that has a liquid-holding container or bottle with a large open top for easy top filling and cleaning of the container.

Another object of the present invention is to provide a cap for a top-fill hummingbird feeder in which the liquid-holding container or bottle of the feeder does not have to be inverted after filling in order to create a vacuum to control flow of the liquid nectar to the feeder's feeding basin or liquid tray.

A further object of the present invention is to provide a top fill hummingbird feeder in accordance with the preceding objects which includes an improved removable top or cap for the top opening of the liquid-holding container or bottle to more reliably form an airtight seal between the removable top and the bottle top opening.

Still another object of the present invention is to provide a top fill hummingbird feeder in accordance with the preceding object in which the improved removable top cap or seal includes a reinforced vertically elongated sealing ring in the nature of a cork type sealing member that allows the user to more readily form an airtight seal between the removable top and bottle top opening when assembling the top on the bottle threads.

Yet another object of the present invention is to provide a top-fill hummingbird feeder with cork-type sealing member in accordance with the preceding objects, which has components that can be easily manufactured from readily available and known materials and that can be easily assembled for ease and economy of manufacture and easily disassembled and reassembled for easy cleaning and which will be sturdy and long lasting in operation and use.

These and other objects are achieved by a removable cap for a top-fill hummingbird feeder which includes a generally upstanding reservoir bottle or liquid container having a large opening at its upper end. The removable top or cap is engaged with the upper end of the liquid container to close and form an airtight seal of the upper end opening when the feeder is assembled for use. The bottom of the bottle or container has a lower bottom opening, preferably in the form of a threaded bottleneck, which can be screw-threaded into a central collar of a feeding basin that has a plurality of feeding ports in a known arrangement.

The cap has a two-part construction including an outer shell and an inner sealing member. The inner sealing member includes a sealing element in the form of a vertically elongated, reinforced sealing ring that is received within the top of the liquid container with a friction fit to automatically form a cork-type seal when the cap is secured to the top of the container by tightening the outer shell onto the container. Loosening of the outer shell pulls the sealing ring upwardly and out of engagement with the container for removal of the cap. The outer shell is preferably threadedly engaged with the top of the liquid container.

The improved top or cap configuration makes the top fill hummingbird feeder of the present invention more reliable in forming the requisite airtight seal over the large bottle top opening when the cap is screw-threaded onto the threads at the upper end of the bottle or container. This improved configuration also is more user-friendly and facilitates the user's ability to establish the requisite airtight seal when screw-threading on the cap.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
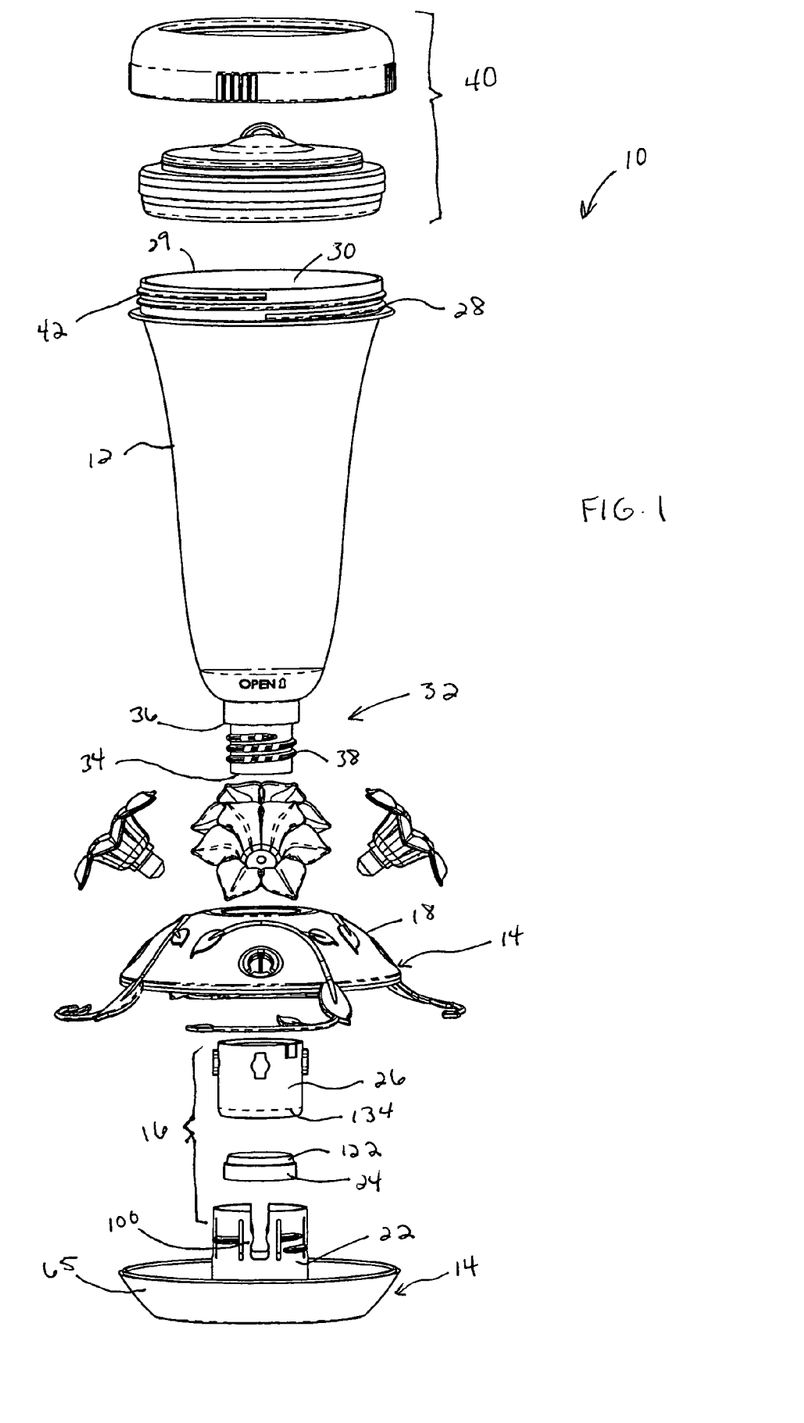
FIG. 1 is an exploded side view of a top-fill hummingbird feeder with a cap in accordance with the present invention.

As shown in the exploded view of FIG. 1, the present invention is directed to a cap generally designated by reference numeral 40 for a top-fill hummingbird feeder generally designated by reference numeral 10. The feeder includes a reservoir bottle or liquid container generally designated by reference numeral 12, a feeding basin generally designated by reference numeral 14, and a sealing mechanism generally designated by reference numeral 16.

It is noted that the cap 40 according to the present invention is suitable for use with a variety of styles of top-fill hummingbird feeders having various sealing mechanisms. The feeder basin 14 and sealing mechanism 16 shown in FIG. 1 correspond with those set forth in the '924 application, previously incorporated by reference. As such, the feeding basin 14 includes a cover 18 and a base 20, and the sealing mechanism 16 includes an upwardly extending collar 22, a stopper 24 and a generally tubular insert 26.

The liquid container 12 has an upstanding neck 28 forming a large opening 30 at its upper end for easy filling and cleaning of the liquid container. The bottom of the liquid container, generally designated by the reference numeral 32, has a smaller lower opening 34, preferably in the form of a bottle-neck 36 with external threads 38 so that it can be screw-threaded into the tubular insert 26 of the sealing mechanism 16. The specific structure and operation of the sealing mechanism 16 shown in FIG. 1 is set forth in the '924 application and will not be repeated here.

The removable top or cap 40 closes off the large opening 30 at the top of the liquid container 12 in an airtight sealed condition. As shown in FIGS. 2-6, the removable cap 40 is preferably made of two pieces for ease of manufacture and sealing effectiveness, and includes an outer shell 202 and an inner sealing member 204.

Figure 2:
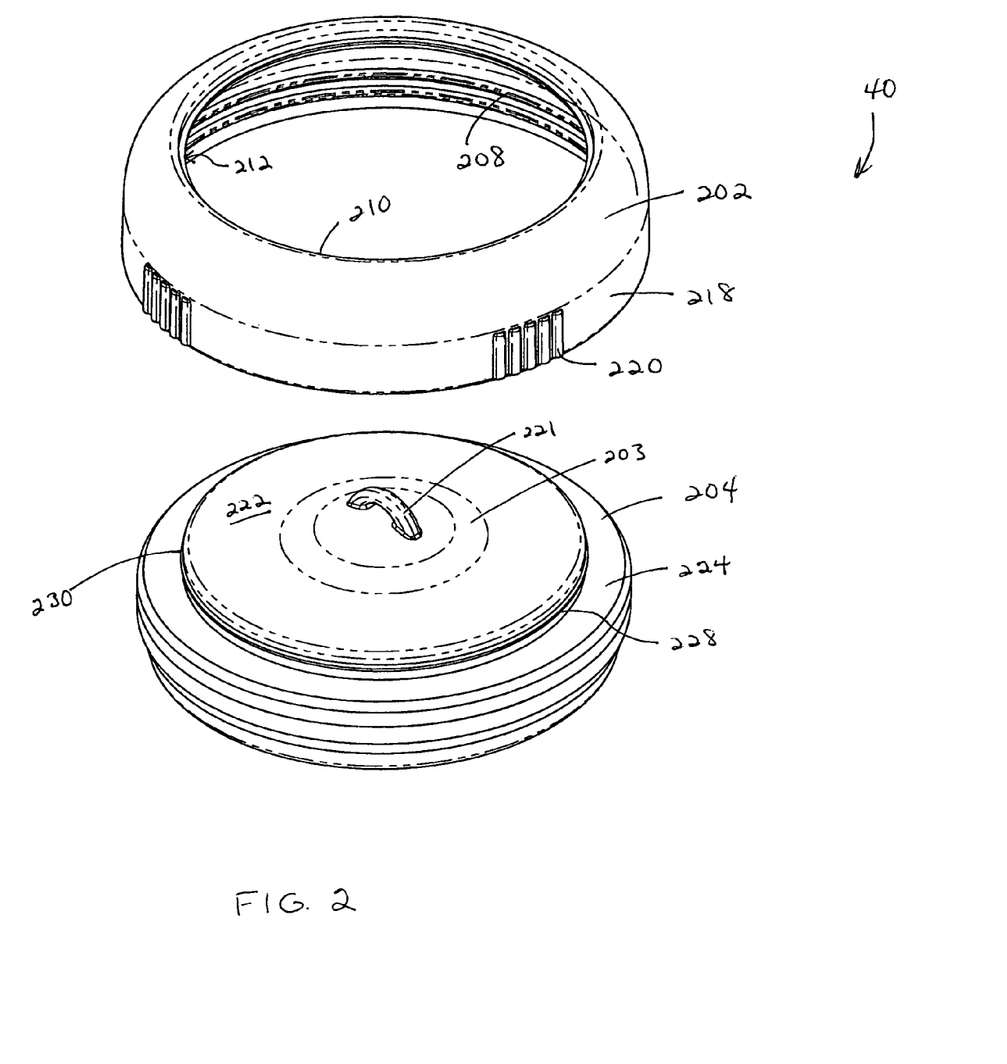
FIG. 2 is an exploded perspective view of the components of the two-part cap of the top-fill hummingbird feeder of FIG. 1.

The outer shell 202 is molded as an annular ring with internal threads 208 that mate with the external threads 42 on the upstanding neck 28 of the liquid container. The outer shell also includes a central opening 210 with an inner flange generally designated by reference numeral 212. The inner flange 212 has a flat lower surface 226 and a sloped side surface 214 that tapers outwardly toward the internal threads 208 from the top 216 of the flange to the flat lower surface 226. As shown in FIG. 2, the outer surface 218 of the outer shell 202 may be provided with texture elements 220 to facilitate the user's grip when opening and closing the cap 40.

Figure 4:
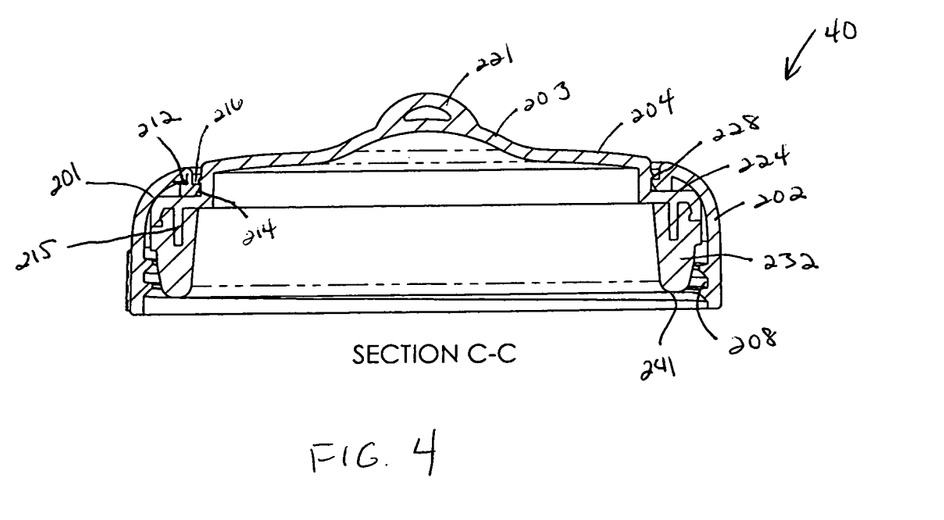
FIG. 4 is a cross-sectional view of the cap components of FIG. 3 as assembled.

The inner sealing member 204 has an elevated central portion 222 that fits within the central opening 210 of the outer shell 202, and a rim portion 224 that abuts against the flat lower surface 226 of the flange 212 on the outer shell 202. The outer edge 211 of the rim portion also abuts against the curved inner surface 227 of the outer shell 202 at contact point 201 (see FIG. 4). The central portion 222 is joined to the rim portion 224 by a generally vertical outer side surface 230. A small raised lateral ring 228 on the outer side surface 230 of the central portion 222 rides along the sloped side surface 214 of the flange 212 when the shells are brought into engagement with one another and then "snaps" into position on the top 216 of the flange 212 when the cap is assembled for use, as shown in FIG. 4. The top 203 of the inner shell 204 is preferably formed to include a hook or loop 221 to allow the feeder when in use to be suspended from a support structure (not shown) in a hanging configuration.

Figure 3:
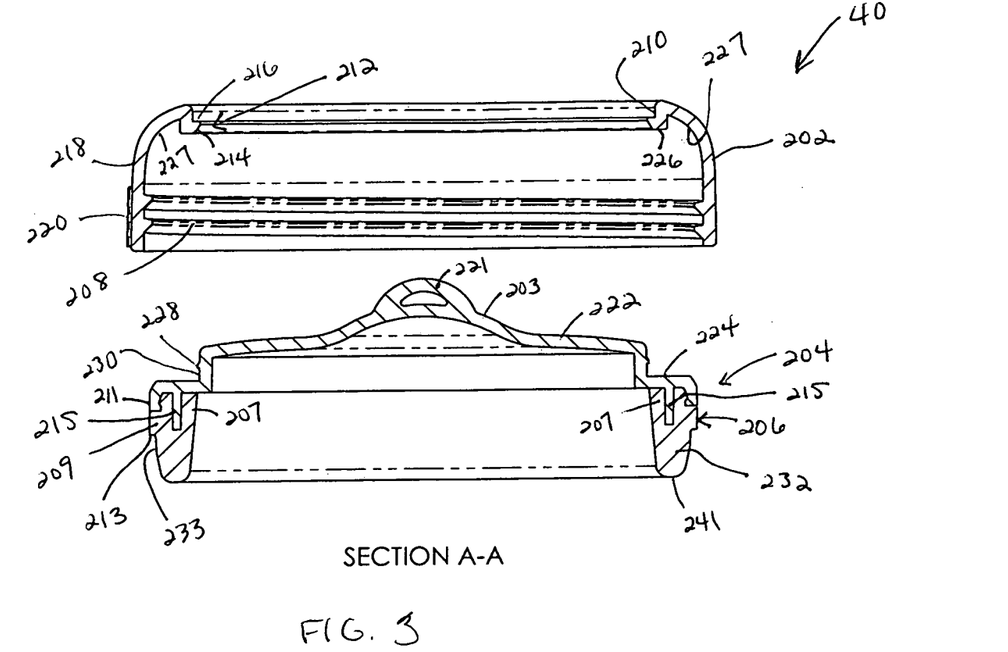
FIG. 3 is an exploded cross-sectional view of the cap components of FIG. 2.

The inner sealing member 204 includes a vertically elongated annular sealing element, generally designated by reference numeral 206, that is overmolded around a depending reinforcing ring 215 which extends downwardly from underneath rim portion 224. The vertically elongated sealing element 206 is generally U-shaped and includes an inner portion 207, an outer portion 209 and a lower portion 232. The inner portion 207 is formed on the inside of ring 215 and the outer portion 209 is formed on the outside of ring 215 and extends to the outer edge 211 of rim portion 224. The lower portion 232 is formed below the inner and outer portions and is integral therewith. As shown in FIGS. 3 and 4, the lower portion 232 tapers toward a bottom tip 241. This ring-reinforced configuration of the sealing element 206 as overmolded onto the reinforcing ring 215 prevents the sealing element from being shifted or twisted in use.

The outer portion 209 preferably includes a projecting lip 213 which engages the top edge 29 of the bottle or container 12 when the top or cap is sufficiently screw-threaded into place on threads 42 of the bottle 12. The lip 213 serves to seal the face of the top edge of the bottle so that, when the cap is sufficiently tightened, a double seal is formed to close the top of the feeder.

As shown in FIG. 3, the lower portion 232 of the sealing element 206 acts like a cork, being designed to be pushed or forced into the opening 30 with a press or friction fit as the user screw-threads the cap 40 onto the liquid container 12. Because the lower portion 232 of the sealing element 206 is frictionally inserted within the opening 30 shortly after the threads 208 on the outer shell 202 engage the threads 42 on the neck 28 of the liquid container, a cork-type seal is made prior to full thread engagement. As a result, the outer shell 202 of the cap 40 can remain somewhat loose while the sealing element 206 nonetheless effectively seals the top of the container.

Alternatively, according to a modified embodiment of that shown in FIGS. 2-6, the sealing element 206 can be made with a greater length dimension such that the lower portion 232 of the sealing element 206 is frictionally inserted within the opening 30 before the threads 208 on the outer shell 202 engage the threads 42 on the neck 28 of the bottle. In such modified embodiment, a cork-type seal is made prior to initial thread engagement. As a result, the outer shell of the cap 40 can remain loose or even unengaged while the sealing element 206 nonetheless effectively seals the top of the container.

The sealing element 206 is preferably made from a semi-rigid, deformable material, such as any suitable polymeric or elastomeric material, preferably a thermoplastic elastomer (TPE). In contrast, the outer shell 202 and the inner sealing member 204 of the top or cap 40 and the bottle or container 12 are all made or molded from a rigid polymeric material, such as polypropylene, preferably high density polyethylene. Since the outer diameter 233 of the lower portion 232 (above the bottom tip 241) of the sealing element 206 is larger than the inner diameter 231 of the bottle opening 30, the lower portion 232 is configured to deform as the sealing element 206 is automatically pushed or forced into the opening 30 with a press or friction fit to form the airtight seal over the bottle opening 30 upon threading the cap onto the bottle top opening.

Figure 5:
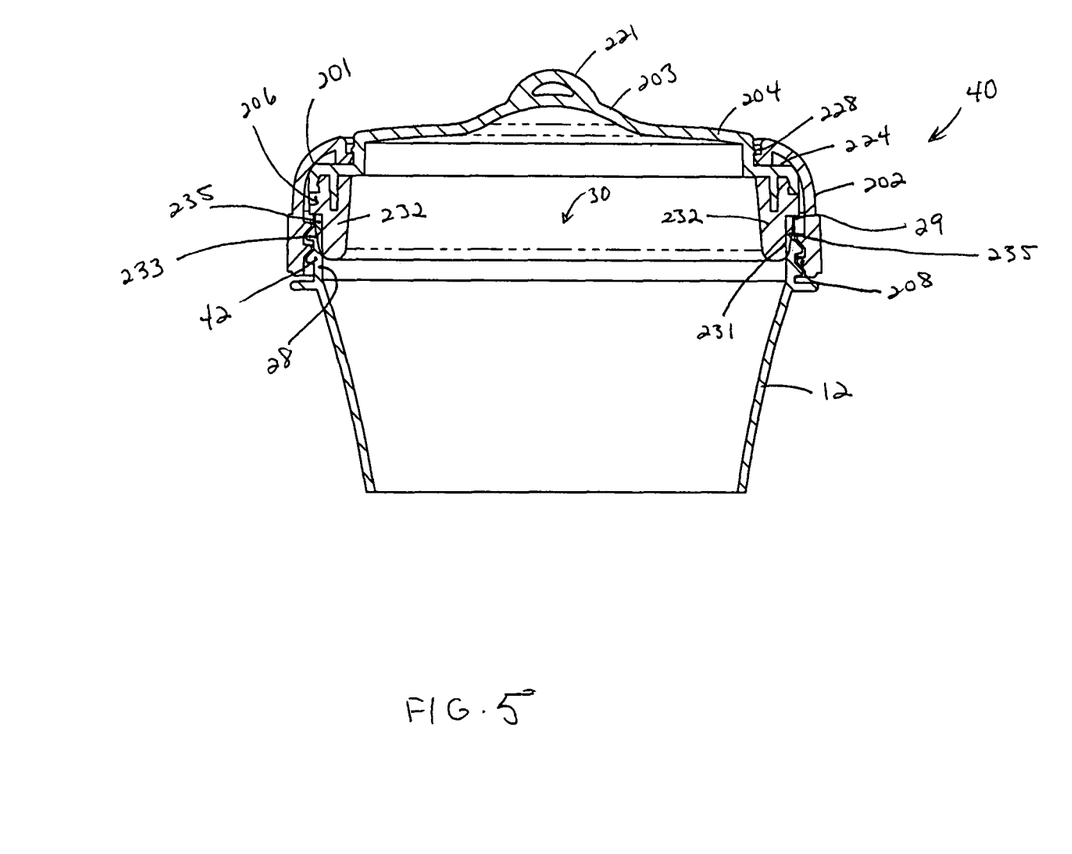
FIG. 5 is a cross-sectional overlapping view of the assembled cap components of FIG. 4 mounted on the container, with the overlap depicting the extent of inward squeezing of the sealing element when the cap is threaded onto the bottle.
Figure 6:
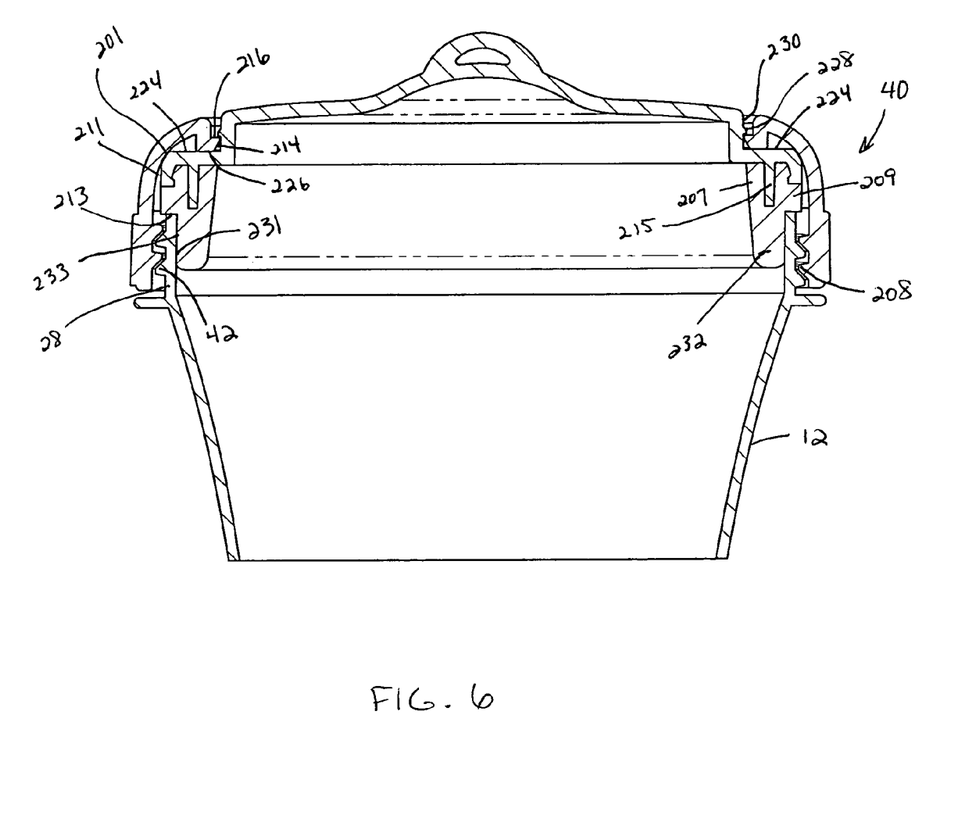
FIG. 6 is a cross-sectional view of the assembled cap components of FIG. 4 as mounted on the container.

The seal formed by the frictional insertion of the lower portion 232 of the sealing element 206 is evident from the cross-sectional view of the lid and container as shown in FIGS. 5 4D and 6. In FIG. 5, the lower portion 232 of the sealing element 206 is shown in the same orientation as in FIGS. 3 and 4, i.e., the inward squeezing of the lower portion 232 that occurs upon frictional insertion of the lower portion 232 into the container is not illustrated. Instead, the lower portion 232 of the sealing element 206 and the upper end of the container are shown in overlay format to illustrate the difference between the inner diameter 231 of the container and the outer diameter 233 of the lower portion 232 which, without inward squeezing, creates an overlapping portion 235. The extent of this overlapping portion 235 forms the friction seal when the sealing element 206 is pressed into the top of the container and the lower portion 232 is squeezed inwardly to be compressed against the inner diameter 231 of the container, as shown in FIG. 6. When the outer shell 202 is fully tightened, the inner surface 227 of the outer shell 202 is pressed against the outer edge 211 of the rim portion at the contact point 201, and the rim portion 224 is pressed firmly against the flat lower surface 226 of the flange 212 on the outer shell 202.

The nature of the material from which the outer shell 202 and inner sealing member 204 are made is such that the outer shell 202 can easily rotate with respect to the inner sealing member 204 as the former is screw-threaded onto threads 40 of the bottle 12 while the inner sealing member 204 is being forced downwardly with a press or friction fit into the opening 30. This ease of rotation, combined with the frictional resistance created between the lower portion 232 and the inner diameter 231 of the bottle, results in only the outer shell 202 rotating when the outer shell 202 is threaded and unthreaded with respect to the bottle; the inner sealing member 204 does not rotate, but is only pushed downwardly when the outer shell 202 is tightened, and then pulled upwardly when the outer shell 202 is unthreaded to remove the cap.

More particularly, when securing the cap shown in FIGS. 2-6 to the bottle, there is an initial phase during which the bottom tip 241 of the lower portion 232 of the sealing element enters the bottle but is not frictionally engaged therewith as the threads 208 begin to engage the bottle threads 42. During this stage, there is virtually no resistance to rotation of the outer shell. With continued rotation of the outer shell, however, the outer diameter 233 of the lower portion comes into engagement with the inner diameter of the bottle, at which point the user can feel the increased resistance as the act of tightening the outer shell also serves to concurrently push the sealing element 206 downwardly into the bottle opening. Once the resistance has increased, i.e., the lower portion 232 has come into engagement with the inner surface of the bottle, the force necessary to fully tighten the outer shell 202, and fully insert the sealing element, remains essentially constant until the outer shell is fully threaded. As already noted, the inner sealing member 204 does not rotate while the sealing element 206 is being pushed into the bottle.

When unscrewing the cap or top, starting from the point when the outer shell is fully tightened, initial unthreading of the outer shell meets with rotational resistance due to the elastic force exerted by the sealing element which was compressed when the outer shell was tightened. This compression creates increased frictional engagement between the inner surface 227 of the outer shell and the rim portion 224 of the inner sealing member at the contact point 201. As unthreading continues, the resistance essentially disappears for a time as the compression force at the contact point is released and the outer shell rotates without exerting any lifting force on the inner sealing member 204. As unthreading proceeds further, however, resistance once again increases at the point when the abutment of the top 216 of the flange 212 of the outer shell 202 against the ring 228 of the inner sealing member 204 begins to lift the sealing member 204 upwardly as the outer shell is rotated.

From this point, the act of unthreading the outer shell also serves to concurrently lift the sealing element 206 upwardly out of the bottle opening, again without rotation of the inner sealing member 204. As unthreading or unscrewing of the outer shell 202 is completed, the upward movement of the sealing element 206 disengages the outer surface of the lower portion 232 from the inner surface of the bottle opening 30 and allows the lower portion 232 to resume its original, unsqueezed state (as shown in FIGS. 3 and 4). Once the lower portion 232 is disengaged from the bottle, any remaining unthreading needed to completely remove the outer shell from the bottle meets with virtually no resistance.

In the modified version of the embodiment shown in FIGS. 2-6 noted above, in which the sealing element has a greater vertical length so that the sealing element engages with the bottle before threading begins, resistance to rotation of the outer shell would be noticed by the user sooner when tightening the cap since the sealing element is being pushed into the mouth of the bottle as soon as threading begins. When unscrewing such cap, the sequence outlined above would substantially be the same. In particular, the user would notice resistance when first loosening the outer shell, followed by less resistance during the phase before the outer shell exerts lifting force on the inner sealing member, followed by increased resistance as the sealing element is lifted out of engagement with the bottle by the unthreading process. When unthreading is completed, the user would pull the bottom tip of the sealing element out of the bottle like one removes a cork to fully remove the cap.

The cap according to the present invention may be used with the feeder described in the '924 application as noted herein. In addition, the cap may also be used with other top-fill hummingbird feeders including the hummingbird feeder described in co-pending application, Ser. No. 12/382,848, owned by the assignee of the instant invention, as well as the hummingbird feeder disclosed in the '487 patent noted above. The cap may also be effectively used with the hummingbird feeder disclosed in co-pending application, Ser. No. 12/591,289 ("the '289 application"), also owned by the assignee of the instant invention.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. In combination, a hummingbird feeder and a cap, the combination comprising:
   a top-fill hummingbird feeder having a liquid container with an opening at an upper end thereof for filling and cleaning of said container; and,
   a removable cap for said hummingbird feeder, said removable cap including an outer shell and an inner sealing member, said outer shell configured to engage with an outer surface of said liquid container upper end, said outer shell formed as an annular ring having a central opening; and said inner sealing member having a central portion that fits within said outer shell central opening and a rim portion including an upper surface that abuts against a lower surface of said outer shell when said inner sealing member is assembled with said outer shell, said inner sealing member further including a vertically elongated sealing element that frictionally engages with an inner surface of said liquid container upper end to form an airtight seal with said upper end opening when said cap is placed on said container, said vertically elongated sealing element extending downwardly and having a lower portion that is tapered toward a bottom tip.

2. The combination as set forth in claim 1, wherein said annular ring includes internal threads that are configured to engage with external threads on the outer surface of the liquid container upper end when said outer shell is threadedly engaged by being rotated relative to said container.

3. The combination as set forth in claim 2, wherein said outer shell includes an inner flange surrounding said central opening and having a top surface and a flat bottom surface, said lower surface of said outer shell against which said rim portion upper surface abuts being formed by said flat bottom surface of said inner flange, said inner flange further including a sloped side surface that tapers outwardly from the top surface toward the internal threads and said flat bottom surface.

4. The combination as set forth in claim 3, wherein said outer shell and said inner sealing member are separable and have a coupled configuration when assembled for use, said central portion of said inner sealing member having an outer side surface with a raised lateral ring that rides along the sloped side surface of said outer shell inner flange when said inner sealing member and said outer shell are to be assembled in said coupled configuration to form said cap, said inner sealing member reaching said coupled configuration with said outer shell when said ring reaches an upper edge of said sloped side surface and snaps into position on said inner flange top.

5. The combination as set forth in claim 4, wherein said inner sealing member is freely rotatable with respect to said outer shell when said inner sealing member and said outer shell are in said coupled configuration.

6. The combination as set forth in claim 1, wherein said rim portion includes a downwardly depending reinforcing ring and said vertically elongated sealing element is overmolded around said reinforcing ring.

7. The combination as set forth in claim 6, wherein said vertically elongated sealing element is generally U-shaped and includes an inner portion formed on an inside of said reinforcing ring, an outer portion formed on an outside of said reinforcing ring, and said lower portion, said lower portion being formed below the inner and outer portions and integral therewith.

8. The combination as set forth in claim 7, wherein an outer diameter of said outer portion is greater than an outer diameter of said bottom tip, and said outer diameter of said outer portion is greater than an inner diameter of said inner surface of said liquid container upper end so that said sealing element is squeezed into a cork-type engagement with said liquid container when said sealing element is sufficiently inserted into said container opening.

9. The combination as set forth in claim 7, wherein said outer portion includes an outwardly projecting lip that seals a top edge of said liquid container upper end when said cap is sufficiently tightened onto said container.

10. A hummingbird feeder comprising:
    a liquid container having an externally threaded upper end with a top end opening and a bottom end opening;
    a removable two-part cap for sealing the top end opening;
    a feeding basin in communication with said bottom end opening and having at least one feeding port in liquid flow communication with a fluid holding area inside said basin, said feeding port being accessible to hummingbirds; and
    said cap including an outer shell and a separate inner sealing member that is rotatably movable with respect to said outer shell when said inner sealing member is in a coupled configuration with said outer shell, said inner sealing member having a vertically elongated sealing element that extends downwardly and is frictionally received within said container and said outer shell fitting over said upper end of said container, said outer shell having internal threads configured to engage with said threaded upper end to secure said cap onto said container upper end with said downwardly extending vertically elongated sealing element of said inner sealing member tapering toward a bottom tip and forming a cork-type seal against an inner surface of said container upper end when said feeder is assembled for use.

11. The hummingbird feeder as set forth in claim 10, wherein said outer shell is an annular ring with a central opening and said inner sealing member has a central portion that fits within said outer shell central opening and a rim portion that abuts against said outer shell when said inner sealing member is in said coupled configuration with said outer shell.

12. The hummingbird feeder as set forth in claim 11, wherein said outer shell includes an inner flange surrounding said central opening that has a top and a flat bottom surface, said rim portion of said inner sealing member abutting against said flat bottom surface of said inner flange in said coupled configuration, said inner flange further including a sloped side surface that tapers outwardly from the top toward said internal threads and said flat bottom surface.

13. The hummingbird feeder as set forth in claim 12, wherein said central portion of said inner sealing member has an outer side surface with a raised lateral ring that rides along the sloped side surface of said outer shell inner flange when said inner sealing member and said outer shell are to be assembled in said coupled configuration to form said cap, said inner sealing member reaching said coupled configuration with said outer shell when said ring reaches an upper edge of said sloped side surface and snaps into position on said inner flange top.

14. The hummingbird feeder as set forth in claim 11, wherein said rim portion includes a downwardly depending reinforcing ring, said vertically elongated sealing element being overmolded around said reinforcing ring.

15. The hummingbird feeder as set forth in claim 14, wherein said vertically elongated sealing element is generally U-shaped and includes an inner portion formed on an inside of said reinforcing ring, an outer portion formed on an outside of said reinforcing ring, and a lower portion that is formed below the inner and outer portions and is integral therewith.

16. The hummingbird feeder as set forth in claim 15, wherein an outer diameter of said outer portion is greater than an outer diameter of said bottom tip, and said outer diameter of said outer portion is greater than an inner diameter of said inner surface of said liquid container upper end so that said sealing element is squeezed to form said cork-type seal with said liquid container when said sealing element is sufficiently inserted into said container opening.

17. The hummingbird feeder as set forth in claim 16, wherein said outer portion includes an outwardly projecting lip that seals a top edge of said liquid container upper end when said cap is sufficiently tightened onto said container.

18. A method of securing a two-part cap to a top-fill hummingbird feeder comprising the steps of:
providing a hummingbird feeder having a liquid container with an externally threaded upper end adjacent a top end opening;
providing a cap including an outer shell and a separate inner sealing member that is rotatably movable with respect to said outer shell when said inner sealing member is in a coupled configuration with said outer shell, said inner sealing member having a vertically elongated sealing member that tapers toward a bottom tip and said outer shell having internal threads;
placing the two-part cap into a coupled configuration;
bringing the cap into abutment with the upper end of the container where said vertically elongated sealing member begins to enter the top end opening; and
rotating the outer shell relative to the container to engage the internal threads of said outer shell with the external threads on said container upper end to secure the cap to said container, said step of rotating being continued until the cap is fully tightened to both increase a degree of threaded engagement between the cap and the container and to concurrently push the vertically elongated sealing member downwardly into the top end opening with frictional engagement against an inner surface of said container so that said sealing member forms a cork-type seal against said container inner surface.

19. The method as set forth in claim 18, further comprising, between the steps of bringing the cap into abutment and rotating the outer shell, the step of pressing the sealing element downwardly into initial frictional engagement against an inner surface of said container so that said sealing member forms a cork-type seal against said container inner surface even before said outer shell is threadedly engaged with said container.

20. The method as set forth in claim 18, wherein said inner sealing member does not rotate with said outer shell during said step of rotating.

\* \* \* \* \*